Sept. 6, 1960 W. HERMES ET AL 2,951,993

SYNCHRONIZED CRYSTAL OSCILLATOR

Filed Jan. 27, 1958

INVENTOR
WILLEM HERMES
JOHANNES ENSINK
BY
AGENT

United States Patent Office 2,951,993

Patented Sept. 6, 1960

2,951,993

SYNCHRONIZED CRYSTAL OSCILLATOR

Willem Hermes and Johannes Ensink, Hilversum, Netherlands, assignors to North American Philips Company, Inc., New York, N.Y., a corporation of Delaware Filed Jan. 27, 1958, Ser. No. 711,436

Claims priority, application Netherlands Jan. 30, 1957

3 Claims. (Cl. 331—26)

Figure 1:
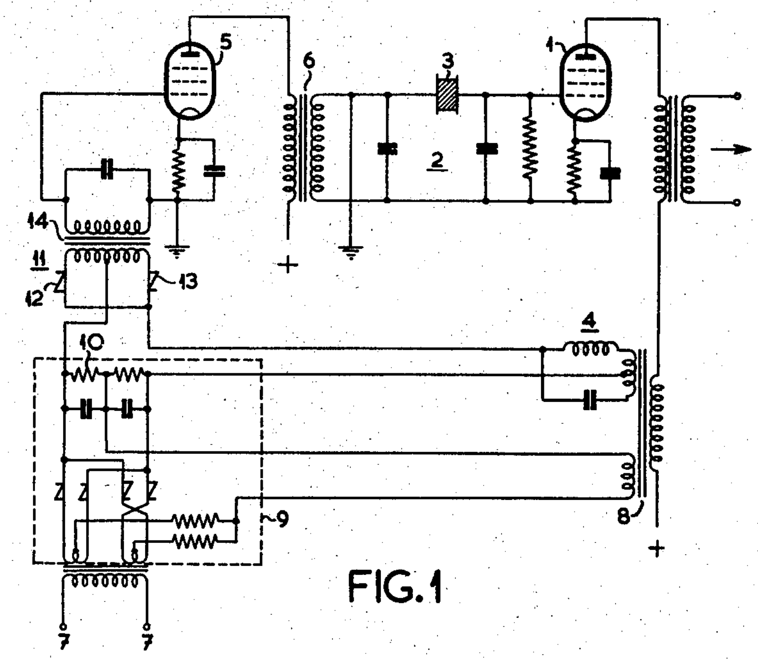

The invention relates to a synchronized crystal oscillator of the type described in U.S. Patent No. 2,760,073, issued to us on August 21, 1956. The herein shown oscillator comprises an amplifier with a feed-back path having a crystal, this path producing self-oscillation of the amplifier, and a synchronizing circuit including a phase-comparison stage to produce a control voltage. The value of the control voltage corresponds to the phase difference between the oscillation from the oscillator and a synchronizing oscillation which synchronizes the oscillator. The synchronizing circuit is formed by a second feed-back path, which feeds back to the crystal a current which is shifted in phase by substantially 90° relative to the oscillator current through the crystal and which path includes furthermore a push-pull amplitude modulator provided with rectifier diodes. To this modulator are supplied the control-voltage and the oscillator voltage, so that the amplitude of this 90° phase-shifted current varies in accordance with the control-voltage. The invention has for its object to provide an improvement, particularly a simplification of the embodiment described in the said patent, this improvement consisting in that the first feed-back path includes a reactance, which produces the 90° phase-shift required of the current fed back via the second feed-back path to the crystal, whilst furthermore the phase comparison stage and the push-pull amplitude modulator are combined to form a single push-pull stage.

Figure 2:
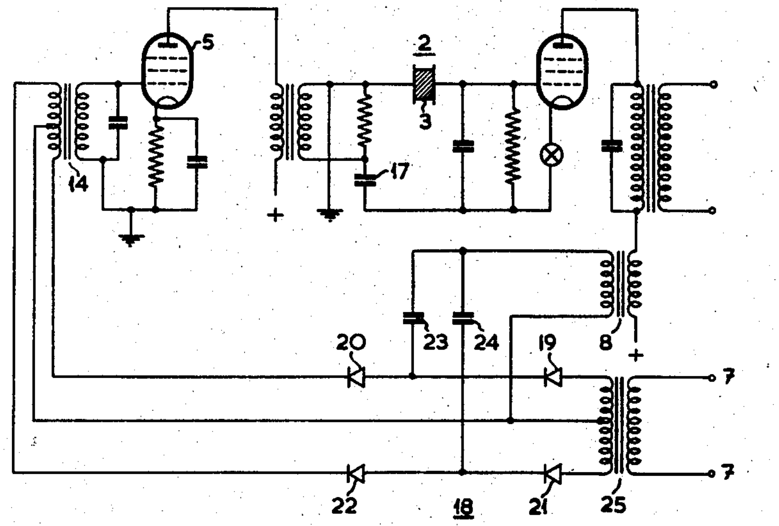

The invention will be described with reference to the drawing, wherein:

Fig. 1 is a schematic diagram of the synchronized oscillator described in the aforementioned patent; and Fig. 2 is a schematic diagram of a synchronized oscillator in accordance with the present invention.

Referring to Fig. 1, reference numeral 1 designates an amplifying tube, having a Colpitt feed-back 2 between earth, control-grid and cathode, the crystal 3 being included between control-grid and earth. Owing to this feed-back the amplifier is set self-oscillating, the frequency produced coinciding substantially with the resonance frequency of the crystal 3. Apart from this first feed-back path 2, 3 provision is made of a second feed-back path comprising a 90° phase-shifting network 4, coupled with the anode circuit of the tube 1, and a second amplifying tube 5, the anode circuit of which is coupled via a transformer 6 with the grid circuit of the tube 1.

In order to produce synchronization of the oscillations produced by the oscillator 1 with a synchronizing oscillation supplied to the terminals 7, this synchronizing oscillation as well as the oscillation from the oscillator produced across the secondary winding of an anode transformer 8 of the tube 1 are fed to a phase comparison stage, constructed in the form of a ring modulator 9, so that across the output filter 10 of this phase comparison stage 9 is produced a voltage which is a measure for the phase difference between the oscillations from the tube 1 and the synchronizing oscillations at the terminals 7. This control-voltage together with the oscillations from the oscillator with a phase shift of 90° in the network 4, is supplied to a push-pull amplitude modulator 11, comprising the rectifiers 12 and 13 and a transformer 14 with a central tapping, the secondary winding of which is coupled with the grid circuit of the tube 5. It can then be proved that in spite of the current fed back to the crystal via the second feed-back path the total voltage across the crystal remains substantially constant, so that there is no risk of overload.

In accordance with the invention the first feed-back path 2 includes a reactance, particularly a capacitor 17 (Fig. 2), the output oscillation of the tube 5 being rendered operative in series with this reactance, so that the required 90° phase shift between the currents fed back to the crystal via the two feed-back paths is obtained. It is thus rendered possible, on the one hand to dispense with the phase shifting network 4 of Fig. 1 and on the other hand to combine the phase-comparison stage 9 and the push-pull amplitude modulator 11 to form a single push-pull stage 18.

The synchronizing oscillation is fed, to this end, via series-connected rectifiers 19, 20 and 21, 22 directly to the transformer 14, whilst the transformer 8 is connected on the one hand via capacitors 23 and 24 to the connecting conductors between the rectifiers 19 and 20 and between the rectifiers 21 and 22 respectively, on the other hand to the centre of the synchronizing input transformer 25 and to the centre of the transformer 14. Half of the transformer 25 thus operates with the transformer 8, the rectifier 19 or 21 respectively and the capacitor 23 or 24 respectively as a single-sided phase detector, whereas the transformer 8 with the rectifier 20 (or 22 respectively) the capacitor 23 (or 24 respectively) and one half of the transformer 14 is connected as a single-sided amplitude modulator. Only then, in the transformer 14 push-pull action occurs, which provides a considerable simplification as compared with the initial circuit arrangement. If, moreover, the pass directions of the rectifiers 19, 20 and 21, 22 are the same, leak resistors connected in parallel with the capacitors 23 or 24 respectively may be dispensed with. If necessary, the centre of the transformer 25 (or 14 respectively) may be connected to a tapping (not shown) of the secondary winding of the transformer 8.

What is claimed is:

1. A synchronized oscillation generator comprising an amplifier having an input circuit and an output circuit, a feed-back path including a crystal element coupled to said input circuit thereby to produce a first wave in said amplifier, means for deriving from said output circuit a second wave having a frequency equal to the frequency of said first wave, said feedback path including a reactance element producing a phase shift of substantially 90° between said first and second waves, input means for a synchronizing signal, and means connected to feed back said second wave to said input circuit comprising a combined phase comparator and modulator stage, means for applying said second wave and said synchronizing signal to said combined stage thereby to produce an output signal at the frequency of said second wave and having variations as determined by the variations of the phase between said second wave and said synchronizing signal, and means for applying said output signal to said input circuit thereby to control the frequency of the said first wave.

2. A synchronized oscillation generator comprising an amplifier having an input circuit and an output circuit, a feed-back path including a crystal element coupled to said input circuit thereby to produce a first wave in said amplifier, means for deriving from said output circuit a second wave having a frequency equal to the frequency of said first wave, said feedback path including a reactance element producing a phase shift of substantially 90° between said first and second waves, input means for a synchronizing signal, a combined phase comparator and modulator stage, means for applying said second wave and said synchronizing signal to said combined stage thereby to produce an output signal at the frequency of said second wave and having variations as determined by the variations of the phase between said second wave and said synchronizing signal, and means for applying said output signal to said input circuit thereby to control the frequency of the said first wave, said combined phase comparator and modulator stage comprising a first transformer having a primary winding and a tapped secondary winding, a second transformer having tapped primary winding and a secondary winding, series connected rectifiers interconnecting the ends of the tapped windings of said transformers, capacitance means for applying said second wave to the respective junctions of the series connected rectifiers, and means for applying said synchronizing signal to the primary of said first transformer.

3. A synchronized oscillation generator as claimed in claim 2, wherein said series connected rectifiers are connected to have the same pass direction.

References Cited in the file of this patent

UNITED STATES PATENTS

| | | |
|---|---|---|
| 2,676,259 | Hansen | Apr. 20, 1954 |

FOREIGN PATENTS

| | | |
|---|---|---|
| 993,365 | France | Oct. 30, 1951 |